US012602226B1

(12) United States Patent
Zhang et al.

(10) Patent No.: US 12,602,226 B1
(45) Date of Patent: Apr. 14, 2026

(54) COMPLEX CODE MODIFICATION VIA CHAIN OF THOUGHT PROMPTING

(71) Applicant: Amazon Technologies, Inc., Seattle, WA (US)

(72) Inventors: Jiangtao Zhang, Pleasanton, CA (US); Ramu Panayappan, Sunnyvale, CA (US); Sreenaath Vasudevan, Cupertino, CA (US); Mark Fawaz, Dublin, CA (US); Samiullah Mohammed, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 278 days.

(21) Appl. No.: 18/467,246

(22) Filed: Sep. 14, 2023

(51) Int. Cl.
*G06F 8/76* (2018.01)
*G06F 40/194* (2020.01)

(52) U.S. Cl.
CPC .............. *G06F 8/76* (2013.01); *G06F 40/194* (2020.01)

(58) Field of Classification Search
CPC ........................................................ G06F 8/76
See application file for complete search history.

(56) References Cited

U.S. PATENT DOCUMENTS

| | | | | |
|---|---|---|---|---|
| 10,043,009 | B2 * | 8/2018 | Upchurch | G06F 21/12 |
| 11,579,868 | B1 * | 2/2023 | Zhang | G06F 8/72 |
| 11,687,830 | B2 * | 6/2023 | Siracusa | G06F 8/10 |
| | | | | 706/12 |
| 11,704,099 | B1 * | 7/2023 | Morse | G06F 8/751 |
| | | | | 717/143 |
| 11,809,841 | B1 * | 11/2023 | Zhang | G06F 8/33 |
| 11,934,458 | B2 * | 3/2024 | Ji | G06F 8/751 |
| 11,947,935 | B2 * | 4/2024 | Clement | G06N 3/044 |
| 12,019,992 | B2 * | 6/2024 | Bahrami | G06F 8/42 |
| 12,169,715 | B2 * | 12/2024 | Fu | G06F 8/71 |
| 12,314,707 | B2 * | 5/2025 | Duan | G06F 8/33 |
| 12,346,690 | B2 * | 7/2025 | Qiao | G06F 8/73 |
| 2022/0244937 | A1 * | 8/2022 | Prasad | G06N 5/022 |
| 2023/0073052 | A1 * | 3/2023 | Mohylevskyy | G06N 3/04 |
| 2023/0109681 | A1 * | 4/2023 | Gotmare | G06N 3/09 |
| | | | | 704/9 |
| 2023/0418565 | A1 * | 12/2023 | Arumugam Selvaraj | G06F 16/3322 |
| 2024/0086164 | A1 * | 3/2024 | Kramer | G06F 8/36 |
| 2024/0143928 | A1 * | 5/2024 | Zorn | G06F 40/56 |

(Continued)

OTHER PUBLICATIONS

Maciej Besta et al. "Graph of Thoughts: Solving Elaborate Problems with Large Language Models"; Proceedings of the AAAI Conference on Artificial Intelligence—Aug. 2023.*

(Continued)

*Primary Examiner* — Francisco J Aponte
(74) *Attorney, Agent, or Firm* — Nicholson DeVos Webster & Elliott LLP

(57) ABSTRACT

Techniques for complex code modification via chain of thought prompting are described. A modification service obtains code to be modified according to a modification goal, and can decompose the modification goal, via use of a database or a machine learning model, to identify a set of modification steps. The set of modification steps may be organized according to a chain of thoughts, tree of thoughts, or graph of thoughts. The modification service can execute the set of modification steps via use of a machine learning model to yield modified code, which can be returned to a user.

20 Claims, 11 Drawing Sheets

(56) References Cited

U.S. PATENT DOCUMENTS

| | | | |
|---|---|---|---|
| 2024/0161019 A1* | 5/2024 | Lim | G06F 16/215 |
| 2024/0311093 A1* | 9/2024 | Schaefer | G06F 8/37 |
| 2024/0311921 A1* | 9/2024 | Fields | G06F 8/65 |
| 2024/0329948 A1* | 10/2024 | Yuan | G06F 8/4441 |
| 2024/0361996 A1* | 10/2024 | Fu | G06F 8/73 |
| 2024/0403438 A1* | 12/2024 | Chan | G06F 11/0793 |

OTHER PUBLICATIONS

Yao, Shunyu et al., "Tree of Thoughts: Deliberate Problem Solving with Large Language Models", May 17, 2023; arXiv:2305.10601v1 downloaded on Sep. 14, 2023, 11 pages.

Yao, Yao et al., "Beyond Chain-of-Thought, Effective Graph-of-Thought Reasoning in Large Language Models", May 26, 2023; arXiv:2305.16582v1 downloaded on Sep. 14, 2023, 22 pages.

Zhang, Zhuosheng et al., "Automatic Chain of Thought Prompting in Large Language Models", Amazon Web Services, Feb. 1, 2023; downloaded from <https://openreview.net/forum?id=5NTt8GFjUHkr> on Sep. 14, 2023, 32 pages.

* cited by examiner

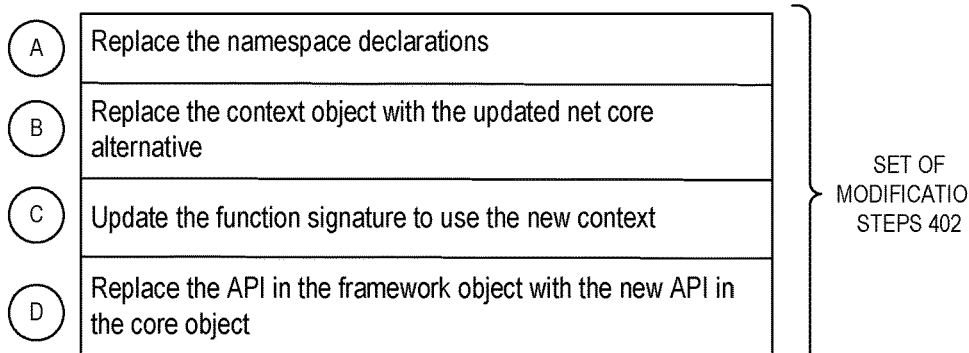

| | |
|---|---|
| (A) | Replace the namespace declarations |
| (B) | Replace the context object with the updated net core alternative |
| (C) | Update the function signature to use the new context |
| (D) | Replace the API in the framework object with the new API in the core object |

SET OF MODIFICATION STEPS 402

```
using Microsoft.Owin;
public string GetContext(string key, IOwinContext context) {
    var result = context.Request.Headers.Get(key);
    return result;
}
```

INPUT CODE SEGMENT (.NET FRAMEWORK) 404

(A) ⬇

```
using Microsoft.AspNetCore.Http;
public string GetContext(string key, IOwinContext context) {
    var result = context.Request.Headers.Get(key);
    return result;
}
```

INTERMEDIATE CODE SEGMENT 406

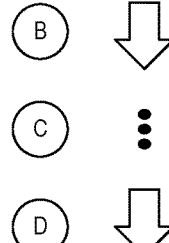

(B) ⬇

(C) ⋮

(D) ⬇

```
using Microsoft.AspNetCore.Http;
public string GetContext(string key, HttpContext context) {
    var result = string.Empty;
    context.Items.TryGetValue(key, out result);
    return result;
}
```

TARGET / OUTPUT CODE SEGMENT (.NET CORE) 408

*FIG. 4*

SET OF
MODIFICATION
STEPS IN A
SEQUENTIAL CHAIN-
OF-THOUGHTS
CONFIGURATION
600

STEP 'A'

Replace the namespace declarations

STEP 'B'

Replace the context object with the updated net core alternative

STEP 'C'

Update the function signature to use the new context

STEP 'D'

Replace the API in the framework object with the new API in the core object

SET OF
MODIFICATION
STEPS IN A TREE-
OF-THOUGHTS
CONFIGURATION
700
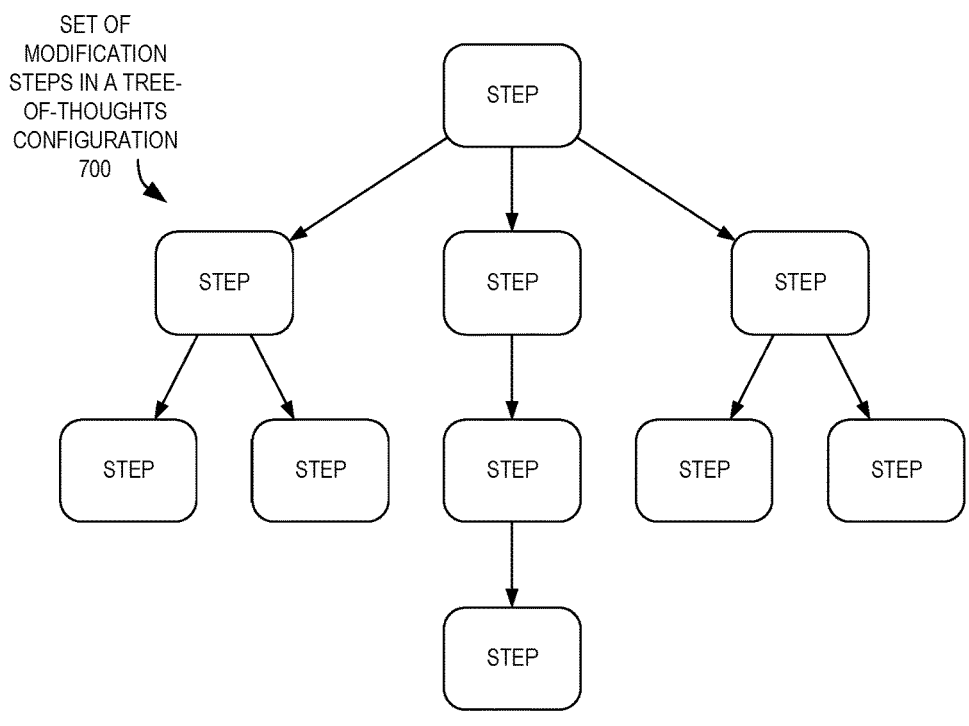
SET OF
MODIFICATION
STEPS IN A GRAPH-
OF-THOUGHTS
CONFIGURATION
750
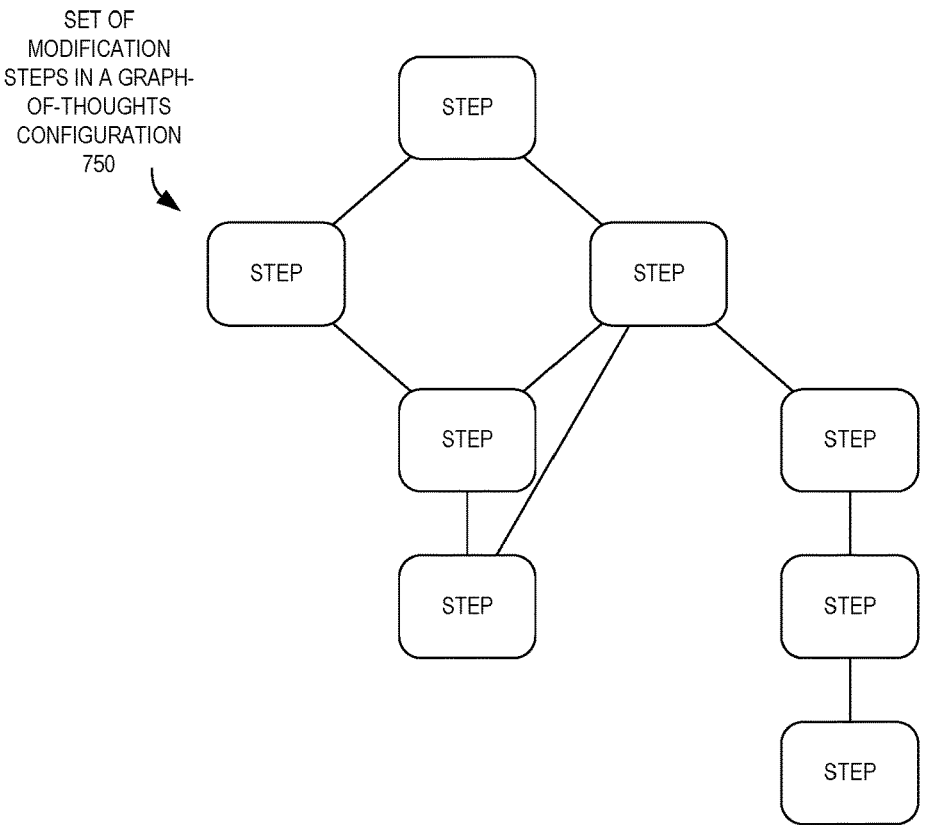
*FIG. 7*

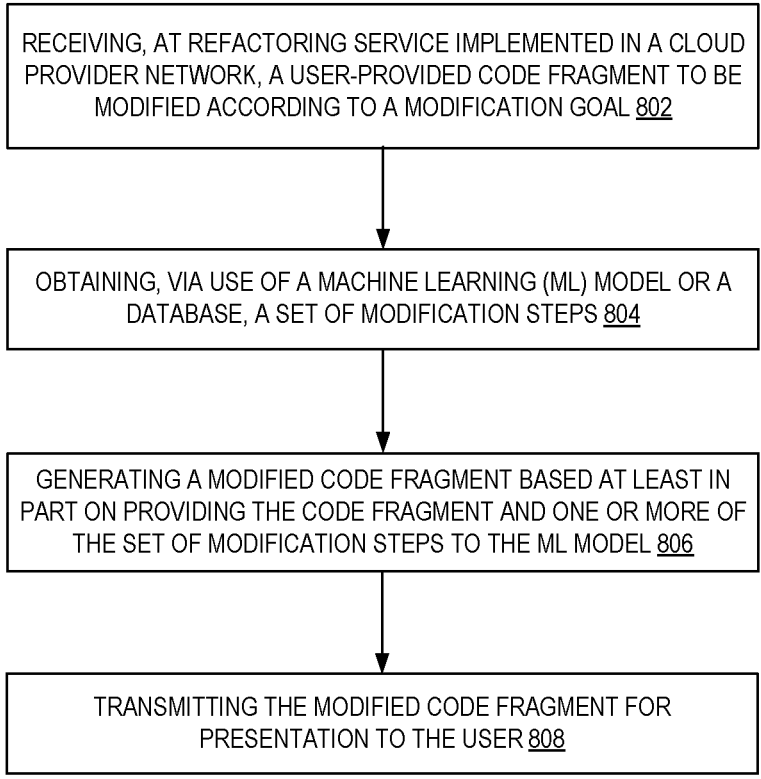

RECEIVING, AT REFACTORING SERVICE IMPLEMENTED IN A CLOUD PROVIDER NETWORK, A USER-PROVIDED CODE FRAGMENT TO BE MODIFIED ACCORDING TO A MODIFICATION GOAL 802

OBTAINING, VIA USE OF A MACHINE LEARNING (ML) MODEL OR A DATABASE, A SET OF MODIFICATION STEPS 804

GENERATING A MODIFIED CODE FRAGMENT BASED AT LEAST IN PART ON PROVIDING THE CODE FRAGMENT AND ONE OR MORE OF THE SET OF MODIFICATION STEPS TO THE ML MODEL 806

TRANSMITTING THE MODIFIED CODE FRAGMENT FOR PRESENTATION TO THE USER 808

*FIG. 8*

COMPLEX CODE MODIFICATION VIA CHAIN OF THOUGHT PROMPTING

BACKGROUND

Software modernization techniques are widely used by business organizations and other entities desiring to improve their information technology (IT) environments in response to changing software application use cases, resource demands, and user access patterns. For example, while many legacy applications were designed for older operating environments with lesser resources and expectations, modern applications now often need the ability to scale quickly to potentially millions of users, have global availability, manage very large amounts of data, and respond to requests in milliseconds. The various processes for upgrading, converting, and rewriting such applications to enable improved performance is referred to generally as "software modernization." Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various examples in accordance with the present disclosure will be described with reference to the drawings, in which:

FIG. 4 is a diagram illustrating an exemplary set of modification steps and code segment modification according to some examples.

FIG. 7 is a diagram illustrating a conceptual exemplary tree of thoughts and graph of thoughts providing modification steps used in code segment modification according to some examples.

FIG. 8 is a flow diagram illustrating operations of a method for automated complex code modification according to some examples.

DETAILED DESCRIPTION

Figure 1:
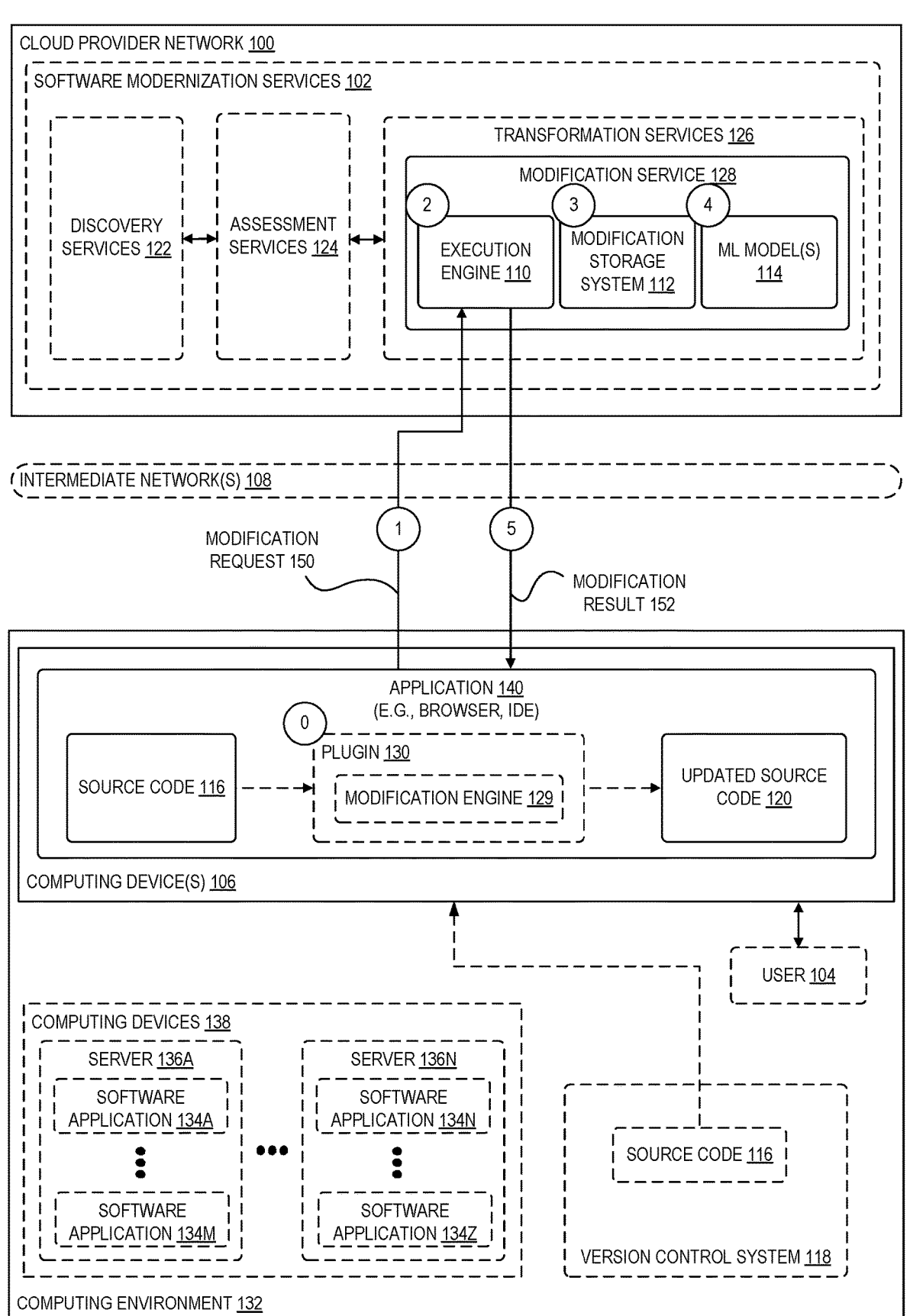
FIG. 1 is a diagram illustrating a cloud provider network environment for complex code modification according to some examples.

The present disclosure relates to methods, apparatus, systems, and non-transitory computer-readable storage media for automated complex code modification. According to some examples, a modification service can programmatically obtain a set of modification steps—according to a chain of thoughts (CoT), tree of thoughts (ToT), graph of thoughts (GoT)—that can be executed utilizing a machine learning (ML) model such as a generative language model to automatically perform code segment modifications in a flexible, efficient, and powerful manner. As used herein, CoT should be read to encompass any of CoT. ToT, or GoT (as trees and graphs of thoughts also involve chains). Accordingly, examples disclosed herein provide a system that can modify source code, such as for porting code from one environment to another to utilize a newer language, framework, and/or a cloud provider network system, refactoring code, modernizing code, etc., in a substantially faster manner with higher quality results than existing systems.

Software modernization broadly refers to converting, rewriting, or porting legacy software applications or systems to more modern computer programming languages, software libraries, protocols, hardware platforms, application architectures, cloud-based services, and the like. Users, organizations, and other entities may often desire to modernize their software applications and systems to improve operational performance and increase application availability, reduce exposure to vulnerabilities (e.g., software crashes, security vulnerabilities, etc.), migrate applications from non-cloud environments to infrastructure provided by a cloud services provider (e.g., to leverage a cloud service's provider reliable infrastructure, increased performance benefits, etc.), and/or enable more efficient ongoing development of the applications, among other possible reasons.

However, modernizing software is extremely challenging for a variety of technical and practical reasons. For example, organizations may have a lack of visibility across large application portfolios, as large organizations may have hundreds, if not thousands, of software systems. In addition to simply being difficult to identify which systems need to be updated or modernized, it is further challenging to determine what dependencies exist and associated risks are involved. Further, the coexistence of legacy and new systems must be managed. Organizations with a large footprint of legacy systems cannot migrate everything at once, instead typically migrating a small set of systems at a time, which requires the old and new systems to work together seamlessly during the transition periods. Moreover, many users and organizations do not have the resources to invest in modernizing their operations, whether it be due to a shortage of manpower, knowledge, technology, or even financial resources. Modernizing software can be a costly and time-consuming endeavor that requires skilled developers, testers, and project managers. Additionally, developers modernizing systems need expert-level knowledge of both the existing systems as well as the desired "new" versions thereof, which many developers do not have.

To this end, some tools exist that attempt to assist in such modernization or refactoring efforts. For example, tools exist that can analyze applications created in a first type of framework or platform (e.g., .NET Framework applications) to assist with porting these applications to another type of framework or platform (e.g., .NET Core applications), for example to run these applications in different environments, such as to use Linux-based operating systems, cloud provider network resources, or the like. As indicated above, porting applications can be a significant manual effort, which is typically error-prone and time intensive, as application owners need to spend significant time identifying the dependencies and APIs used that are incompatible with the new framework or platform. Thus, these tools can scan applications to identify incompatibilities with the target framework or platform, identify known replacements (and potentially make some straightforward "fixes" on the user's behalf), and/or generate detailed compatibility assessments providing an indication of the effort required to port the application.

Accordingly, some porting tools can assist with software porting by actually updating code on the user's behalf. Such tools can be built using straightforward replacement mechanisms to identify and "fix" well-known issues. For example, a tool could implement a decision tree-based rule translator that performs simple replacements like package namespace reference updates and API signature changes. With such systems, a large set of rule translations (e.g., hundreds or thousands or more) are defined and maintained by the tool owner, and these can be used to identify and implement a fair number of fixes automatically on behalf of the application owner. However, even after applying such porting workflows, application owners still go through significant manual effort to transform the remaining incompatible code blocks. For example, there may be more "complex" code changes necessary that cannot be implemented by rule-based replacement techniques, as these tools lack an understanding of more complicated context, might be limited to translating single line changes, and lack the sophistication and domain knowledge needed to address incompatibles having business logic weaved in between them.

In addition to porting legacy code from one framework or platform or language to another, it is often a necessity to refactor it in order to make it cloud-native, serverless, or microservice-compatible. This may involve adding metric collection, automated alarms, dashboarding, and/or other monitoring capabilities, changing synchronous functions to asynchronous functions, refactoring large code blocks for database modernization (e.g., breaking down a single database table into multiple tables), and/or refactoring the interface code to a new standard. While it may be theoretically possible to use rules for some of these tasks, it is practically impossible as there are too many concrete variations of every problem. Thus, human expertise and experience is often necessary to update the code and make the best decisions on how to refactor and improve it. Thus, there still remains a significant level of effort for users to complete complex source code refactoring, which is not fully addressed by current capabilities of existing rule-based systems or other similar techniques.

These challenges, among others, are addressed by the systems and techniques described herein, which includes an automated modification service that is capable of performing automated code modification. Among other benefits, the systems and techniques described herein provide the efficient creation of more resilient software applications, migration of software applications to cloud-based environments, and use of computing resources supporting execution of such applications.

FIG. 1 is a diagram illustrating a cloud provider network 100 environment for complex code modification according to some examples. In FIG. 1, a modification service 128 is implemented within a multi-tenant cloud provider network 100. The modification service 128 can be implemented as hardware, software, or a combination of both. For example, the modification service 128 can be implemented using a set of software components executed by one or typically multiple computing devices in one or multiple locations.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. Cloud provider networks are typically "multi-tenant" as they can provide services to multiple different customers using the same physical computing infrastructure.

The users (or "customers") of provider networks 100 can use one or more user accounts that are associated with a customer account, though these terms can be used somewhat interchangeably depending upon the context of use. Users can interact with a provider network 100 across one or more intermediate networks 108 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

Thus, a cloud provider network (or just "cloud") may refer to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In some examples, the modification service 128 is implemented as part of a software modernization service 102 hosted by the cloud provider network 100. The software modernization service 102 can include one or more discovery services 122, assessment services 124, and/or transformation services 126, where these services are collectively aimed at helping users to discover and use recommended transformation and migration paths for their software applications. The discovery services 122, for example, can include various services, applications, software agents, and other tools (e.g., including downloadable modernization agents) used to identify software applications in users' computing environments 132, collect profile information for identified software applications, and/or perform other analysis and modernization processes. The assessment services 124 enable users and applications to obtain various types of software modernization assessments and recommendations based on obtained application artifacts (e.g., source code 116, bytecode, intermediate language files, etc.) collected for users' applications identified by the discovery services 122 and associated tools. For example, recommendations generated by an assessment service 124 can include recommended modernization strategies, recommended modernization tools, estimated modernization costs, etc. In some examples, the transformation services 126 generally include services and applications that can be used to implement modernization recommendations and migration paths, e.g., based on the performed analyses and recommendations.

As described herein, software modernization services 102 can enable the automatic refactoring of source code and other components of a software application's implementation (e.g., configuration files, frameworks, annotations, etc.), via a modification service 128 that can automatically make changes or modifications to source code 116, resulting in updated source code 120.

For example, in some examples, a modernization agent (e.g., provided by the software modernization services 102) can be installed within a computing environment 132 (or given access to the computing environment or artifacts generated therefrom) that includes one or more application analyzers configured to statically and dynamically analyze application artifacts (e.g., application artifacts including source code 116, bytecode, intermediate code files, or combinations thereof) obtained for software applications 134 undergoing analysis (e.g., any of software applications 134A-134Z running on servers 136A-136N or computing devices 138). In some examples, based on the performed application analyses, an application analyzer may generate application analysis results including, e.g., graph-based models of dependency relationships among application components, information identifying detected anti-patterns, estimated refactoring costs, modernization tool recommendations, and the like. According to examples described here, the modification service 128 (or modification engine 129, supporting the modification service 128 and/or implementing portions thereof) can be used to automatically refactor source code 116 as indicated above.

In FIG. 1, the circles labeled (0)-(5) illustrate an example process in which a user modifies (or otherwise updates, refactors, changes, or the like) application source code 116 using a modification service 128 to yield updated source code 120.

As shown at circle (0), a user 104 may utilize a software application 140 executed by a computing device 106, such as a web-browser, standalone application, integrated development environment (IDE), or the like to interact with the modification service 128 for the purpose of automatically updating source code 116. In some examples, this application 140 may be an IDE and have installed a plugin 130 allowing the user to identify code (e.g., a portion of code referred to as a code segment, which can include a partial line of code, a line of code, multiple lines of code, a function or method, a class, a file including code, a collection of files, or the like) that is to be updated, and thereafter invoke the plugin 130 to cause the modification service 128 to update the identified code.

In some implementations, the plugin 130 includes a modification engine 129, which can orchestrate code modification processes by sending requests to, and receiving responses from, the (remote) modification service 128. In some cases, however, the plugin 130 may include a modification engine 129 that can perform some or all of the functionality described herein with regard to the modification service 128.

Figure 2:
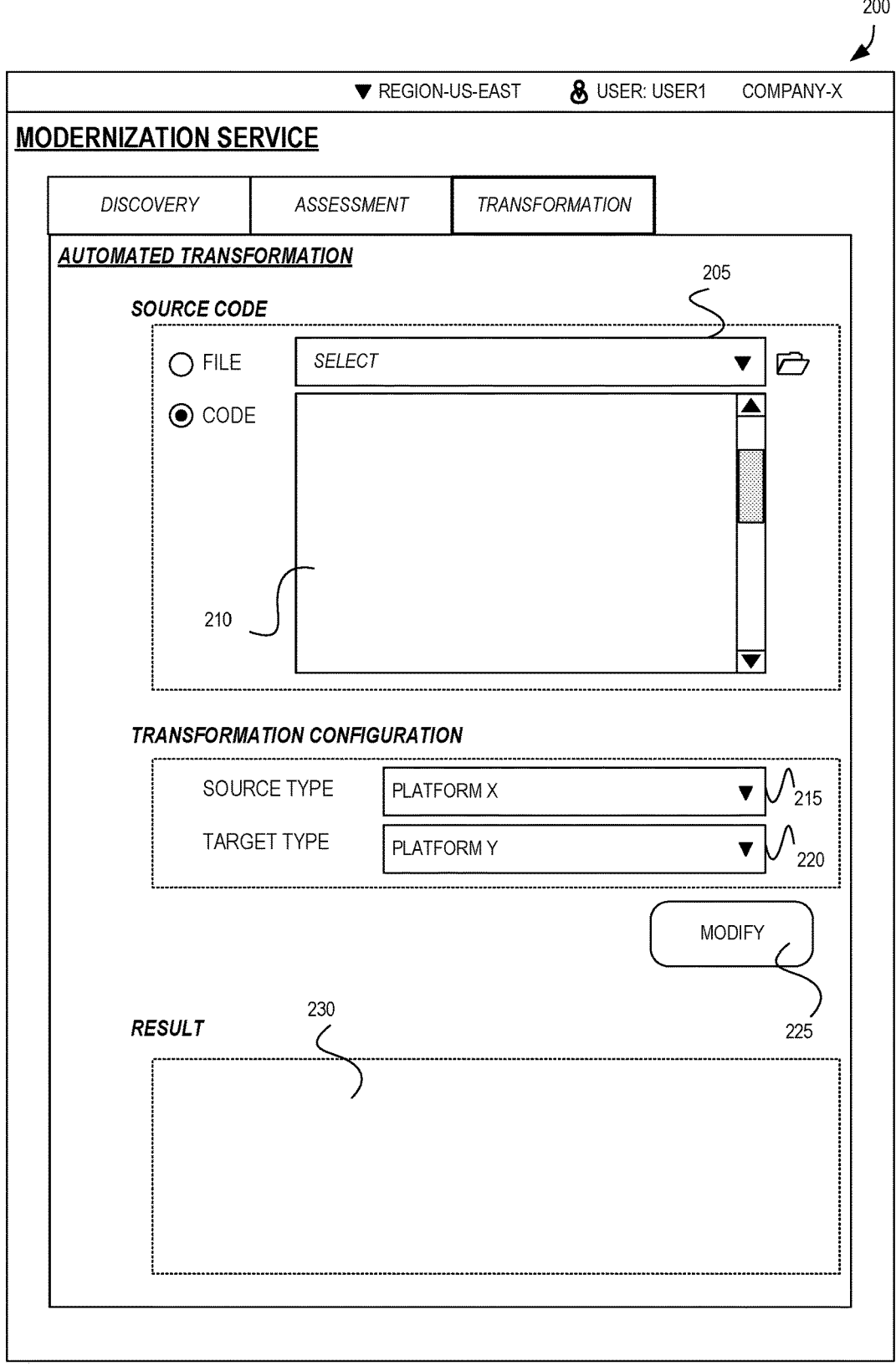
FIG. 2 is a diagram illustrating an exemplary graphical user interface for user-initiated complex code modification according to some examples.

In some examples, application 140 may provide an interface (e.g., a web-based interface) for use by user 104 to invoke the modification service 128. For example, FIG. 2 is a diagram illustrating an exemplary graphical user interface 200 for user-initiated complex code modification according to some examples. This GUI 200 may be provided by the cloud provider network 100, e.g., via a console type application offered via a browser or standalone application. As shown, the GUI 200 provides user interface elements allowing a user to specify or identify which code (e.g., a code segment) is to be updated. Here, user interface element 205 is a drop-down box (possibly together with a folder icon allowing for file-based or project-based navigation) allowing a user to select a file (or folder, collection of files, etc.) to be updated. The GUI 200 also includes another user interface element 210—here, a textarea (or text input box) allowing a user to "paste" or input code to be updated, drag-and-drop code or file, etc.

The GUI 200 of FIG. 2 also includes a set of controls allowing for other user configuration-here, the user may indicate via user input element 215 a "type" of the source code (e.g., a language, a version, a platform, a framework, or the like) as well as via user input element 220 a "type" of the desired, transformed code or "target" (e.g., a language, a version, a platform, a framework, or the like). In this example, the source type is for a first platform (e.g., .Net) while the target type is for a second platform (e.g., .Net Core).

The GUI 200 also includes a user input element 225 (e.g., a button, icon, or link) allowing the user to initiate a modification or updating process. In some examples, this causes the user's computing device to send a request to the modification service 128 (e.g., an HTTP request carrying an API invocation sent to an endpoint of the cloud provider network) including some or all of the user-provided information (e.g., the code segment(s), the source and/or target type, and the like). In some cases, a result portion of the user interface (here, a user interface element 230 such as a window or box) can be updated in a synchronous manner (e.g., after the modification service 128 has performed the transformation, perhaps without the user having left or manually refreshed the interface) with a result of the transformation-typically including the resultant updated code segment(s) and/or error/status information-though the results can also be provided asynchronously or via different interfaces.

Turning back to FIG. 1, as indicated herein the application 140 may include a plugin 130 comprising a modification engine 129 that can perform code modifications or orchestrate the modifications (by the modification service 128), or in other examples, the application 140 may be so configured to orchestrate the modifications. In examples where the remote modification service 128 is to perform the code modification, the application 140 at circle (1) can transmit a modification request 150 including or identifying the code segment(s) to be updated, and optionally other configuration information as described herein, to the modification service 128 (e.g., via sending an HTTP/API request to an endpoint (e.g., an IP address or hostname) associated with the modification service 128 or the cloud provider network 100 more generally).

At circle (2), an execution engine 110 can initiate the modification of the source code 116. In some examples, the modification is a two-phase procedure-first, identifying a set of modification steps to be performed, and second, executing the set of modification steps, which may involve the evaluation of intermediate results and/or different combinations of modification steps. These operations may involve the use of a modification storage system 112 and one or more machine learning models 114, as reflected by circles (3) and (4). The modification storage system 112 can be implemented in a variety of ways, such as through use of a database (e.g., relational, key-value, vector, etc.), file system, object storage service, or other set of data structures.

Figure 3:
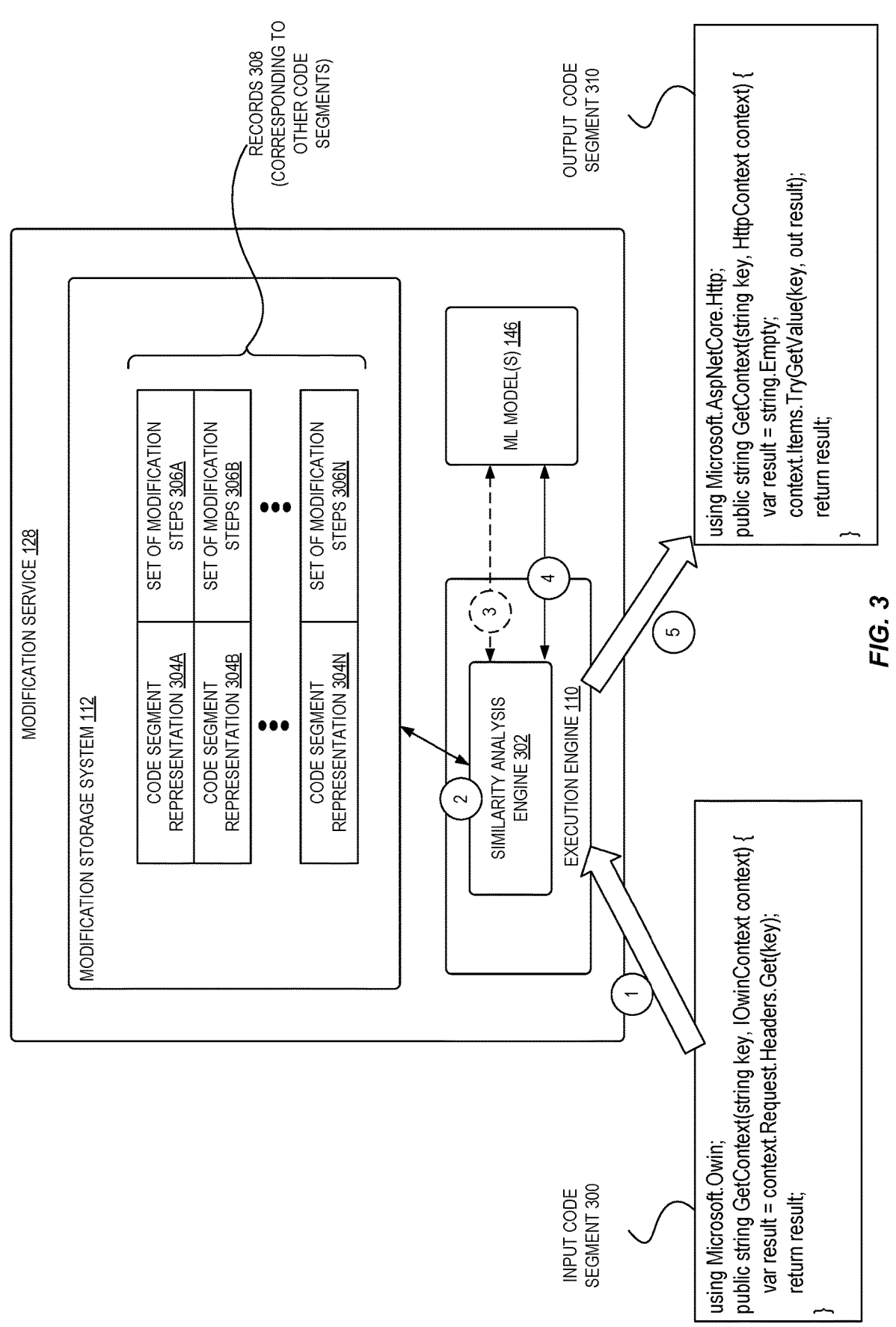
FIG. 3 is a diagram illustrating a code similarity-based approach for identifying modification steps useful in automated complex code modification according to some examples.

For further detail, FIG. 3 is a diagram illustrating a code similarity-based approach for identifying modification steps useful in automated complex code modification according to some examples. With an input code segment 300 provided at circle (1), the execution engine 110 can utilize a similarity analysis engine 302 to identify a set of modification steps to be performed.

For example, in some examples, the execution engine 110 utilizes a modification storage system 112 at circle (2) to identify the set of modification steps. Modification storage system 112 can include a number of records 308 (or rows, entries, or the like) corresponding to a number of other code segments. Each record 308 may include some representation of another code segment (here, code segment representations 304A-304N)—whether it be the complete code segment itself, an encoding of the code segment (e.g., generated by an encoder or encoding layer of a machine learning model, which maps the code segment into a particular point in a multi-dimensional space), or the like. Each record 308 may also include a set of modification steps (e.g., 306A) or identifiers thereof, such as integer-based unique value keys used to index the steps stored elsewhere, that are associated with modifying the code segment of that record (e.g., a set of modification steps that were used to modify the segment, were verified as being correct to modify the segment, or the like).

In some examples, the similarity analysis engine 302 can analyze the source code segment (to be modified) to identify a record 308 associated with another code segment, represented within the modification storage system 112, that is highly similar to it. For example, the similarity analysis engine 302 can transform the code segment by generating an embedding for it (according to a same embedding generator used to generate embeddings for those code segments represented in the database 112) and identify which other embeddings (corresponding to the other code segments, as stored as code segment representations 304) are sufficiently "close" or "nearby." As is known to those of skill in the art, various distance or similarity-based techniques can be utilized to compare different representations (e.g., embeddings)—any such technique can be utilized. For example, the similarity analysis engine 302 can determine a "closest" other embedding to the embedding of the code segment at issue. In some examples, the set of modification steps associated with that "closest" (or most similar) other code segment can be used to modify the current code segment. As another example, the "raw" source code can be the representation, and the similarity analysis can include a cosine similarity approach known to those of skill in the art, involving determining cosine-similarities (e.g., measuring the cosine of the angle between two vectors, corresponding to a pair of code segments, projected into a multi-dimensional space).

In other examples, the set of modification steps associated with the "closest" other code segment can be used to modify the current code segment only when the distance between the two is beneath a threshold (or alternatively, the similarity between the two is above a threshold—e.g., 90% similar or more), which indicates that the "other" code segments set of modification steps will likely be useful for the current modification task. In such examples, when the distance is too large (or the similarity is too small), the execution engine 110 may obtain a set of modification steps in another manner, e.g., querying/prompting an ML model 114 at optional circle (3), such as a generative language model, to determine a set of steps to transform the input source code 116 segment according to a modification goal (e.g., a software modification task, such as to convert the code segment into using a different platform or framework).

As discussed elsewhere herein, the set of modification steps can be in different forms. Each individual modification step can be a particular change to be made to the source code—e.g., remove a call to a particular function, change a return type of a function, modify a type of a variable, change an API invocation, replace a packet, change a function prototype from synchronous to asynchronous, replace a database item, add an additional safety check, update a configuration, refactor a type of platform-specific code, etc.—but the set of modification steps can provide additional information. For example, the set of modification steps can be in a Chain of Thought (CoT) type organization, indicating a sequence of steps to be performed, one at a time. Alternatively, in some examples the set of modification steps can be in a Tree of Thought (ToT) type organization, thus presenting a tree-like structure indicating that different paths could be taken (meaning various different groupings of modification steps could be executed), while in some examples the set of modification steps can be in a Graph of Thought (GoT) type organization, thus presenting a graph-like structure indicating that many different paths and combinations of modification steps can be executed, perhaps using a graph search or graph traversal approach known those of skill in the art, including evaluating the benefit of executing particular steps/paths.

Thus, the execution engine 110 can cause modification steps to be executed, which can include use of an ML model 114 at circle (4). For example, an ML model 114 such as a generative language model or large language model (LLM). Generative language models are a type of artificial intelligence that can produce original text based on some input, such as a word, a sentence, or an image. Such models use large amounts of data to learn the patterns and rules of natural language, and then can generate new text that follows those rules. Some examples of generative language models are GPT-3, ChatGPT, and Bard. Generative language models can have many applications, such as chatbots, content creation, summarization, translation, and more.

In some examples, a generative language model can be used as the ML model 114 and prompted to perform code modifications. For example, the execution engine 110 may issue a prompt to the ML model 114 by providing the code segment itself, along with an instruction to perform one (or multiple) of the modification steps to that code segment. In some cases, this may be an iterative process, where the initial source code segment is provided to the ML model 114 along with an instruction to perform a first step (or first set of steps), and the resultant output of the ML model 114 may then be used again as the input for the next iteration, along with another instruction to perform a second step (or set of steps), and so on.

Additionally, in some examples the prompt may also include "sample" modification information. This sample modification information can include, for example, an example code segment together with a modified version thereof that resulted from having executed a set of modification steps (perhaps the same modification steps). This sample modification information can be obtained, for example, via the modification storage system 112 (e.g., by identifying a "most similar" other code segment in the modification storage system 112). Thus, by providing examples in this manner according to a "few-shot" type technique, the ML model 114 can perform modifications to the source code with high accuracy.

At the conclusion of this process, the code segment has been fully updated, which results in output code segment 310 shown at circle (5). Additional detail about the identification of modification steps, the types of "thoughts" and their usage, as well as the interactions with the ML model 114 is provided later herein with regard to subsequent figures.

Turning back to FIG. 1, with a result generated from having used the ML model 114 to perform one or more (or all) of the modification steps, the execution engine 110 can optionally perform operations (e.g., testing the resultant modified code, etc.) and return the modified code as part of a modification result 152 at circle (5). This includes (or identifies, such as via a URI or URL pointing to a stored version) the updated source code 120, which may be presented to the user 104. The modification result 152 can optionally also include metadata such as a description or identification of the modification steps performed, a description or identification of the changed portions of the code, or the like. The user 104 may then examine and/or use the updated source code 120, such as by incorporating it into their project.

For a more complete understanding of a set of modification steps and an actual modification of a code segment, FIG. 4 is a diagram illustrating an exemplary set of modification steps 402 and code segment modification according to some examples. In this example, a sequential set of modification steps 402 (according to a chain-of-thoughts organization) exists with four steps labeled with circles (A)-(D). These steps 402 involve updating a namespace declaration, replacing a context object with an updated alternative object, updating a function signature to use the new context object, and replacing the API in an object with an updated version thereof. As indicated herein, all of the set of modification steps 402 could be provided along with the input code segment 404 in some cases for an "all-in-one" modification, while in other examples each step 402 can be executed one at a time by the model. As shown, the latter approach is employed, whereas the input code segment 404 is first modified with step (A) by the ML model to result in intermediate code segment 406 (having the first "using" line updated), and this intermediate code segment 406 can be used as input for the next invocation of the ML model with a second step (B), and so on, until ultimately all steps have been executed. At this point, the "target" output code segment 408 is generated and returned as the modified code.

Figure 5:
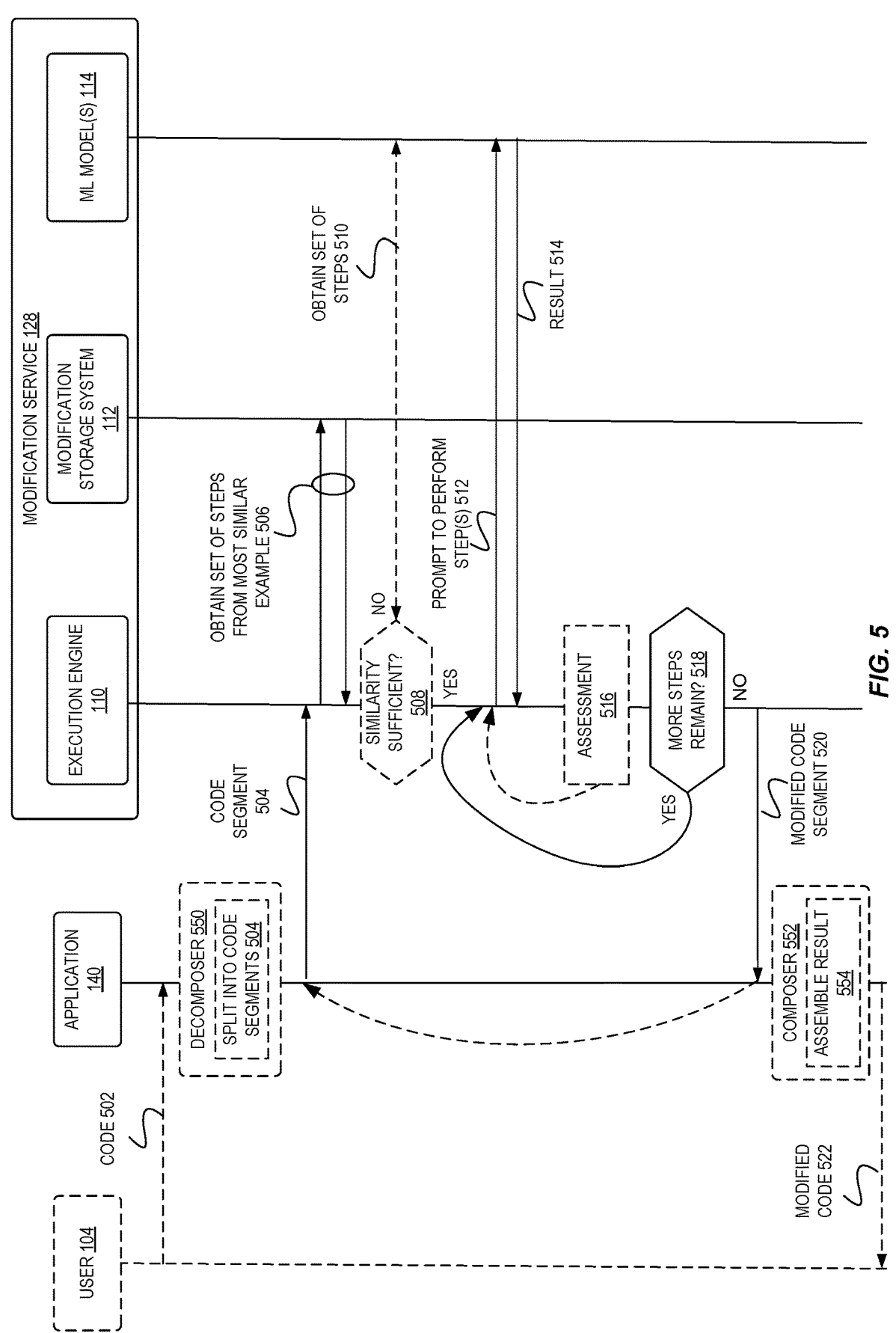
FIG. 5 is a diagram illustrating exemplary interactions and operations of components performing code segment modification according to some examples.

Another example illustration of the system is shown in FIG. 5, which is a diagram illustrating exemplary interactions and operations of components performing code segment modification according to some examples. In this example, a user 104 may provide or identify some code 502 to an application 140 (e.g., an IDE, a web-based console, special purposes application, etc.). In some examples, a decomposer 550 of the application 140 (or alternatively, implemented within the modification service 128 within the cloud provider network) may split the code 502 into more than one segment at 504, such as when its length is past a threshold of size (e.g., the code along with other necessary information such as a modification step, modification goal, contextual information, header information, etc., is collectively too large to be provided to the ML model 114). This code split, at 504, may break down the code according to types of boundaries or segments in the code, such as functions, methods, blocks, classes, files, namespaces, projects, or the like. In some examples, a code segment may be accompanied by (or include) contextual information associated with the split, such as an indicator of how the split was implemented (e.g., at function level, at class level, or the like), other code associated with the project (e.g., declarations, header files, etc.), etc. Thus, the execution engine 110 may act on a code segment 504, which may or may not be the same as the provided code 502. Optionally, along with the code segment 504, the application may also pass configuration information such as an identifier of a source code type (e.g., identifying its platform, language, framework, or the like) and a desired target code type, etc.

With each code segment 504, the execution engine 110 can obtain a set of modification steps at 506 corresponding to a most similar example (or, "other" code segment) that is tracked in a modification storage system 112. This may include the execution engine 110 (or modification storage system 112 itself) generating an embedding for the code segment 504 and performing a search, e.g., via a nearest neighbor type search with the embedding against embeddings in the modification storage system 112 corresponding to other code segments, performing a comparison (e.g., via a cosine similarity technique) between the source code segment and others stored in the modification storage system 112, etc., to find a most similar database-tracked code segment.

In some examples, a check at block 508 may be performed to determine whether the "other" code segment corresponding to the identified set of steps is sufficiently similar to the code segment 504, e.g., by evaluating a distance between the code segment 504 and that other code segment (e.g., generated via use of their respective embeddings, or another comparison technique, to generate a distance or similarity therebetween). In some examples, if the two code segments are not satisfactorily similar (e.g., their embeddings are too distant, or are not close enough) the execution engine 110 may instead prompt the ML model 114 for a set of steps, at 510, e.g., by asking it to identify a number of steps or changes that would need to be made (but not to actually perform them at that time). For example, the execution engine 110 can provide a list of known steps that have been performed previously as "candidate" steps and prompt the ML model 114 to identify which of those steps may be relevant to perform for the particular task at hand.

Thereafter, either one at a time, in small groups, or in total, the ML model 114 is prompted to perform the modification steps at 512, where a result 514 is returned that comprises an updated version of the code (after the model performed the one or more modifications). This result 514 may be a "final" result such as when all steps are performed at once, an "intermediate" result such as when an individual (but not last) step is performed, or the like.

In some examples, an assessment phase 516 is performed after each step execution (or at the conclusion of all steps). For example, the assessment may include statically analyzing the code segment, compiling the code segment, analyzing the code segment, or the like, to determine if there are any known issues—e.g., the code will or will not compile, errors or warnings are generated or are not generated, issues are spotted or not. In some examples, this information can be ultimately provided back for the user's knowledge, perhaps along with the modified code, to enable them to fix any remaining issues, have confidence in the quality of the modified code, or the like.

In some examples, though, this assessment process can assist the execution engine 110 in determining which steps are to be performed, which results are to be used (or thrown away), or the like. For example, in a graph of thoughts or tree of thoughts approach where there are multiple execution paths for the set of modification steps, the execution engine 110 may "test" out the execution of a step and see if the resultant modified code is improved—e.g., generates fewer errors or warnings, includes fewer spotted issues, or the like. If so, the execution engine 110 may continue exploring a path of the GoT or ToT steps and execute a next step in that path or direction, whereas if the output of a step did not improve the code (or made it worse), the execution engine 110 can potentially stop exploring that path (i.e., not executing additional steps on that path, but instead pursue a different path or follow a different branch), potentially discarding the most recent modified code and instead following other paths using previously-returned results (that may be cached).

Thereafter, such as when additional steps (or paths) need to be executed, decision block 518 may cause execution to continue with prompting to perform additional steps. However, when no more steps or paths exist, the modified code segment can be returned at 520 to the application 140 (optionally with metadata or other analysis/assessment data as described above). When an initial code 502 was split into multiple segments at block 504, the flow may continue back to begin work on a next code segment at 504—in such cases, either one segment at a time can be returned as modified code 522, or all the modified code segments can be consolidated and returned as modified code 522. For example, a composer 552 of the application 140 (or alternatively, implemented within the modification service 128 within the cloud provider network) may assemble a final result— modified code 522—based on the one or more returned modified code segments 520. This modified code 522 is thus returned and can be presented to the user.

Figure 6:
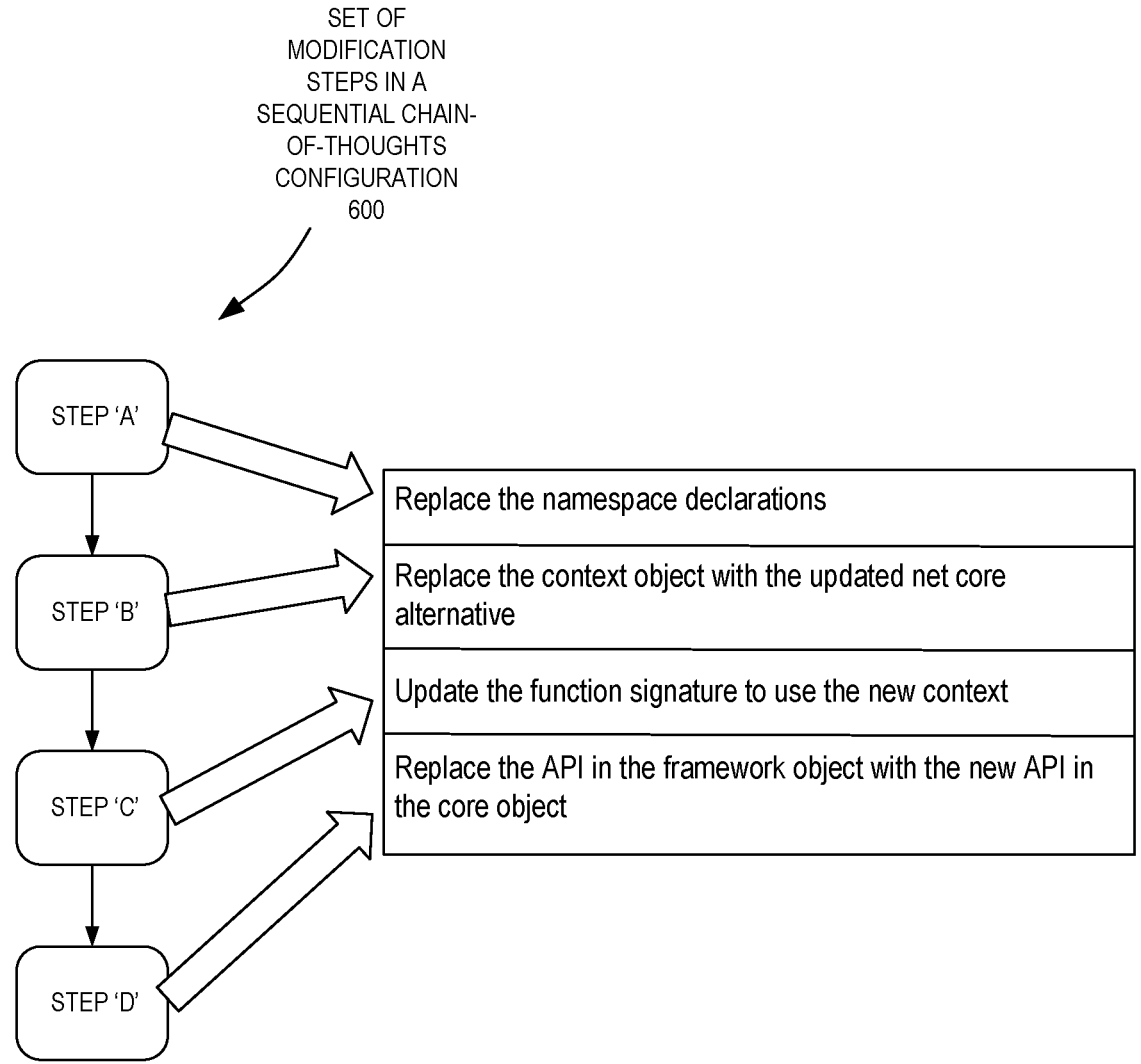
FIG. 6 is a diagram illustrating an exemplary chain of thoughts providing modification steps used in code segment modification according to some examples.

As indicated above, the sets of modification steps can be arranged in a variety of ways, e.g., as a "bag" of unordered steps, as a set of sequential steps according to a chain-of-thoughts organization, as a collection of trees according to a tree-of-thoughts organization, as a collection of thoughts according to a graph-of-thoughts organization, etc. For example, FIG. 6 is a diagram illustrating an exemplary chain of thoughts 600 providing modification steps used in code segment modification according to some examples. In this example, the set of modification steps are sequential (and thus, ordered) and include four steps that may each identify a modification. In some examples, these steps can have corresponding logic or conditions associated thereto. For example, for more efficient execution, particular steps may be executed or not executed based on an "if" type condition (e.g., execute if code segment includes a particular object name, otherwise ship this step).

As described herein, using multiple modification steps is beneficial as every "thought" serves as a stepping stone towards the solving of a problem, which may take various forms such as concise phrases, equations, action descriptions, or plan specifications. When faced with a problem represented by input x and seeking the solution y, a direct mapping from x to y might be over-complicated, and larger ML are similarly unlikely to help due to the observed model size curve, which indicates that as models grow larger they provide diminishing returns in terms of power. For example, increasing the size of an LLM model may improve its reasoning ability, but LLMs are known to face flat scaling curves, where increasing the size of the model does not lead to significant performance improvements on a given task. This can be a limiting factor when trying to improve LLM performance on complex tasks, such as complex code modification, as simply increasing the model size may not lead to the desired improvements.

To overcome this, examples employ a reasoning process that involves the use of intermediate smaller steps from x to y. Using this technique, a model can often achieve perfect or near-perfect performance due to it being substantially easier to solve smaller problems. Thus, examples can use a sequence of interconnected thoughts, denoted as $c1$, $c2$, $c3$, . . . $cn$, which act as bridges between x and y. This approach, referred to as chain of thoughts (CoT), facilitates the transition between the problem and its solution.

As another example, a set of modification steps for refactoring .Net Framework code into .Net Core framework code could include the following sequence according to a CoT approach:

Refactoring Chain:
    (1) Replace the packages
    (2) Replace the namespace declarations
    (3) Replace the function prototype from sync to async
    (4) Replace the object from .NET framework to .NET core
    (5) Replace the database query from sync to async
    (6) Add additional safety check By way of example, the following code segment could be input to be refactored:

```
// .NET Framework code
using System.Web;
using System.Web.Mvc;
using System.Data.Entity;
public ActionResult ProcessRequest(string customerId) {
    if (string.IsNullOrEmpty(customerId)) {
        return new HttpStatusCodeResult(HttpStatusCode.BadRequest);
    }
    var customer = customerDbContext.Customers.Find(customerId);
    if (customer == null) {
        LogHelper.LogInformation($"The customer with id {customerId} cannot be found");
```

-continued

```
    return HttpNotFound( );
  }
  return View(customer);
}
```

As a result of applying the steps, the modified code segment may thus be:

```
// .NET Core Modified Code
using Microsoft.AspNetCore.Mvc;
using Microsoft.EntityFrameworkCore;
async Task<IActionResult> ProcessRequest(string? customerId) {
  if (string.IsNullOrEmpty(customerId) && _customerDbContext.Customers != null) {
    return NotFound( );
  }
  var customer = await _customerDbContext.Customers.FirstOrDefaultAsync(m =>
m.CustomerId == customerId);
  if (customer == null) {
    LogHelper.LogInformation($"The customer with id {customerId} cannot be found");
    return NotFound( );
  }
  return View(customer)
}
```

Alternatively, the set of modification steps may not be a bag of steps or a sequence of steps. For example, a tree of thoughts (ToT) or graph of thoughts (GoT) can be established allowing for multiple pathways from x to y. By representing the problem-solving procedure as a search problem within a tree structure, diverse approaches to reaching the solution can be explored. FIG. 7 is a diagram illustrating a conceptual exemplary tree of thoughts 700 and graph of thoughts 750 providing modification steps used in code segment modification according to some examples. As shown, these configurations provide multiple different paths and/or orderings that are available for exploration. Thus, these structures can be stored and flexibly used to help modify various types of code having different characteristics, and by evaluating different traversals through the tree or graph, a "best" result can be identified that is tailored to the particular code being modified. Thus, these CoT, ToT, and GoT approaches can all emulate both sequential and non-sequential human thought processes, offering distinct ways of organizing thoughts into structured frameworks, translating problem-solving into tree and graph search problems, and facilitating the resolution of problems through smaller, more manageable steps in a coherent and logical manner.

FIG. 8 is a flow diagram illustrating operations of a method for automated complex code modification according to some examples. Some or all of the operations 800 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 800 are performed by the modification service 128 of the other figures.

The operations 800 include, at block 802, receiving, at modification service implemented in a cloud provider network, a user-provided code segment to be modified according to a modification goal. In some examples, the user-provided code segment was received from a computing device executing an integrated development environment (IDE) or console application, wherein the IDE or console application caused the transmission of a request to modify the user-provided code segment.

The operations 800 further include, at block 804, obtaining, via use of a machine learning (ML) model or a database, a set of modification steps.

In some examples, wherein obtaining the set of modification steps comprises: identifying at least a first entry in the database based on a computed similarity between a representation of the code segment and a representation of another code segment associated with the first entry, wherein the first entry includes or identifies the set of modification steps.

In some examples, obtaining the set of modification steps comprises: prompting the ML model to generate the set of modification steps, wherein the prompting includes providing the user-provided code segment, a list of candidate modification steps, and a request to identify ones of the list of candidate modification steps as the set of modification steps.

In some examples, obtaining the set of modification steps comprises: determining that a largest computed similarity between a representation of the code segment and representations of other code segments associated with entries of the database is beneath a threshold amount of similarity; and prompting the ML model to generate the set of modification steps.

In some examples, the set of modification steps comprises a sequential list of modification steps. In some examples, the set of modification steps comprises a graph or tree of nodes corresponding to modification steps. In some examples, generating the modified code segment includes: generating a first result by prompting the ML model to apply a first of the set of modification steps to an input code segment; generating a second result by prompting the ML model to apply a second of the set of modification steps to the input code segment; evaluating the comparative benefit of utilizing the first result versus the second result for reaching the modification goal; and determining to utilize the first result but not the second result as part of generating the modified code segment.

The operations 800 further include, at block 806, generating a modified code segment based at least in part on providing the code segment and one or more of the set of modification steps to the ML model.

In some examples, generating the modified code segment comprises providing the code segment and all of the set of modification steps to the ML model and receiving the modified code segment from the ML model as output.

In some examples, generating the modified code segment comprises prompting the ML model once for each of the set of modification steps.

In some examples, the set of modification steps includes a first modification step having an associated condition, wherein the first modification step is executed when the condition is evaluated to be true and skipped when the condition is evaluated to be false.

The operations 800 further include, at block 808, transmitting the modified code segment for presentation to the user.

Figure 9:
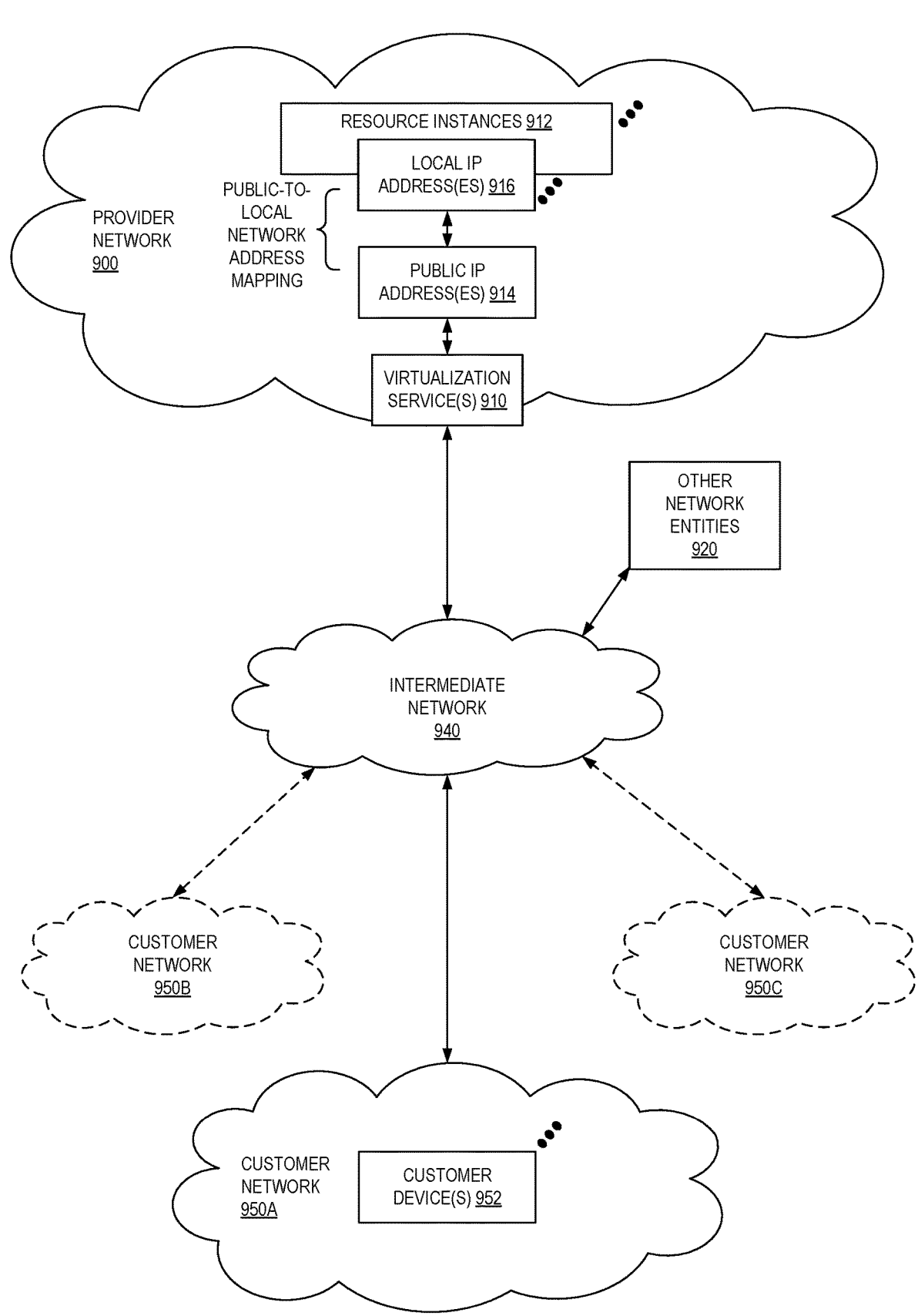
FIG. 9 illustrates an example provider network environment according to some examples.

FIG. 9 illustrates an example provider network (or "service provider system") environment according to some examples. A provider network 900 can provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 can be associated with the resource instances 912; the local IP addresses are the internal network addresses of the resource instances 912 on the provider network 900. In some examples, the provider network 900 can also provide public IP addresses 914 and/or public IP address ranges (e.g., Internet Protocol version 4 (IPv4) or Internet Protocol version 6 (IPv6) addresses) that customers can obtain from the provider 900.

Conventionally, the provider network 900, via the virtualization services 910, can allow a customer of the service provider (e.g., a customer that operates one or more customer networks 950A-950C (or "client networks") including one or more customer device(s) 952) to dynamically associate at least some public IP addresses 914 assigned or allocated to the customer with particular resource instances 912 assigned to the customer. The provider network 900 can also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of the customer network(s) 950A-950C can, for example, implement customer-specific applications and present the customer's applications on an intermediate network 940, such as the Internet. Other network entities 920 on the intermediate network 940 can then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 can be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 900; a customer can then assign their allocated public IP addresses to particular resource instances allocated to the customer. These public IP addresses can be referred to as customer public IP addresses, or simply customer IP addresses. Instead of being assigned by the provider network 900 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
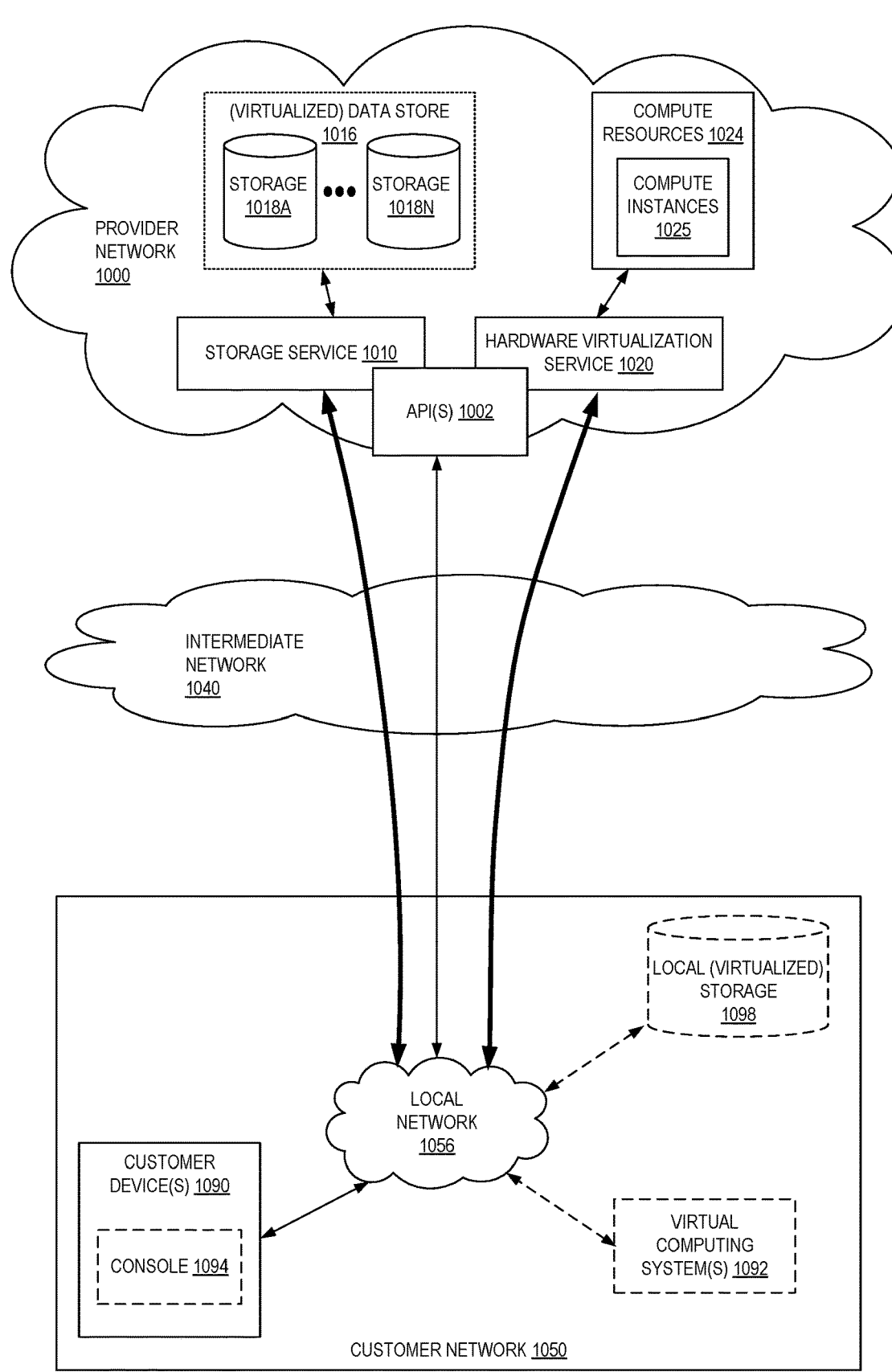
FIG. 10 is a block diagram of an example provider network that provides a storage service and a hardware virtualization service to customers according to some examples.

FIG. 10 is a block diagram of an example provider network environment that provides a storage service and a hardware virtualization service to customers, according to some examples. A hardware virtualization service 1020 provides multiple compute resources 1024 (e.g., compute instances 1025, such as VMs) to customers. The compute resources 1024 can, for example, be provided as a service to customers of a provider network 1000 (e.g., to a customer that implements a customer network 1050). Each computation resource 1024 can be provided with one or more local IP addresses. The provider network 1000 can be configured to route packets from the local IP addresses of the compute resources 1024 to public Internet destinations, and from public Internet sources to the local IP addresses of the compute resources 1024.

The provider network 1000 can provide the customer network 1050, for example coupled to an intermediate network 1040 via a local network 1056, the ability to implement virtual computing systems 1092 via the hardware virtualization service 1020 coupled to the intermediate network 1040 and to the provider network 1000. In some examples, the hardware virtualization service 1020 can provide one or more APIs 1002, for example a web services interface, via which the customer network 1050 can access functionality provided by the hardware virtualization service 1020, for example via a console 1094 (e.g., a web-based application, standalone application, mobile application, etc.) of a customer device 1090. In some examples, at the provider network 1000, each virtual computing system 1092 at the customer network 1050 can correspond to a computation resource 1024 that is leased, rented, or otherwise provided to the customer network 1050.

From an instance of the virtual computing system(s) 1092 and/or another customer device 1090 (e.g., via console 1094), the customer can access the functionality of a storage service 1010, for example via the one or more APIs 1002, to access data from and store data to storage resources 1018A-1018N of a virtual data store 1016 (e.g., a folder or "bucket," a virtualized volume, a database, etc.) provided by the provider network 1000. In some examples, a virtualized data store gateway (not shown) can be provided at the customer network 1050 that can locally cache at least some data, for example frequently accessed or critical data, and that can communicate with the storage service 1010 via one or more communications channels to upload new or modified data from a local cache so that the primary store of data (the virtualized data store 1016) is maintained. In some examples, a user, via the virtual computing system 1092 and/or another customer device 1090, can mount and access virtual data store 1016 volumes via the storage service 1010 acting as a storage virtualization service, and these volumes can appear to the user as local (virtualized) storage 1098.

Figure 11:
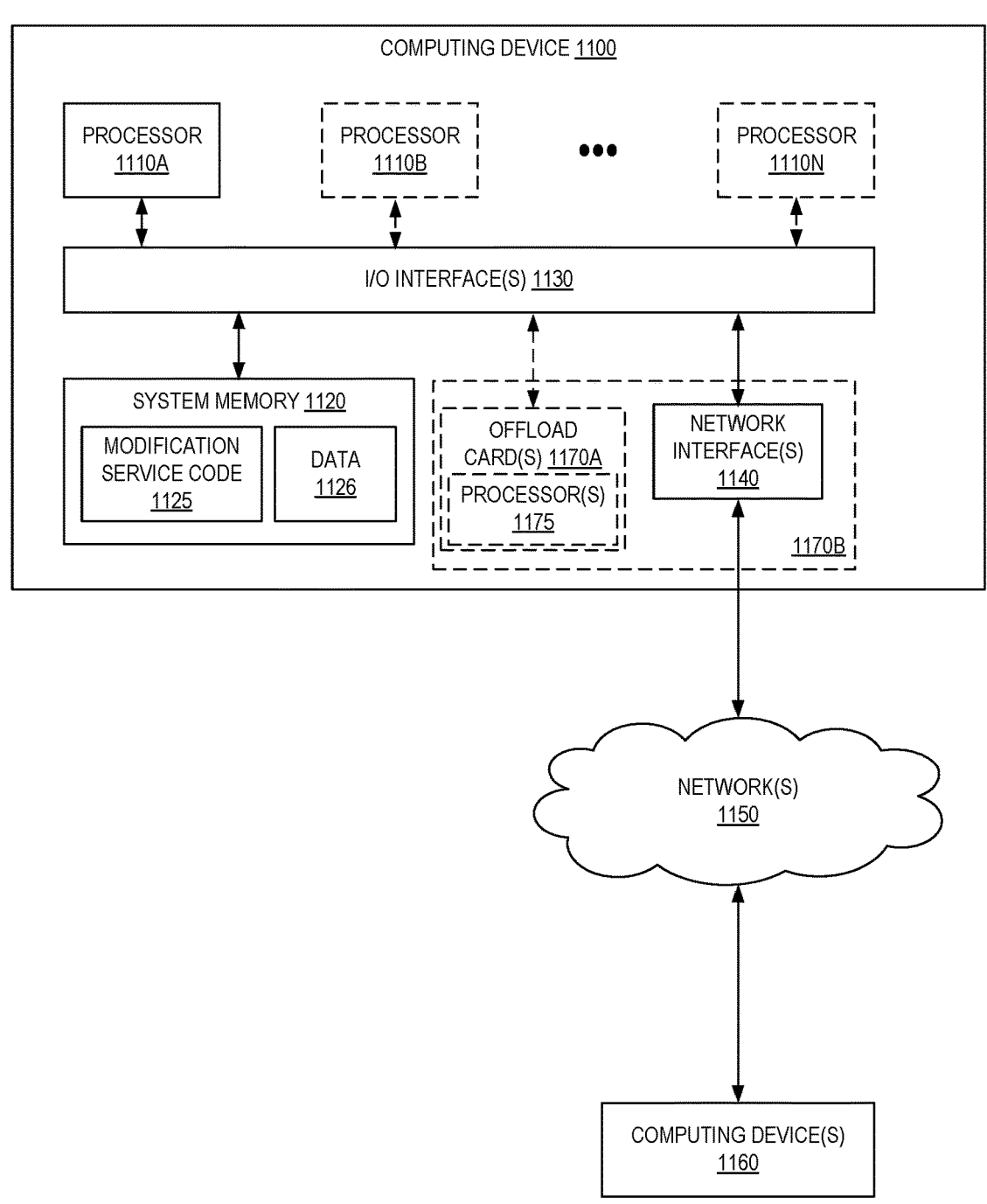
FIG. 11 is a block diagram illustrating an example computing device that can be used in some examples.

While not shown in FIG. 10, the virtualization service(s) can also be accessed from resource instances within the provider network 1000 via the API(s) 1002. For example, a customer, appliance service provider, or other entity can access a virtualization service from within a respective virtual network on the provider network 1000 via the API(s) 1002 to request allocation of one or more resource instances within the virtual network or within another virtual network.
Illustrative Systems In some examples, a system that implements a portion or all of the techniques described herein can include a general-purpose computer system, such as the computing device 1100 (also referred to as a computing system or electronic device) illustrated in FIG. 11, that includes, or is configured to access, one or more computer-accessible media. In the illustrated example, the computing device 1100 includes one or more processors 1110 coupled to a system memory 1120 via an input/output (I/O) interface 1130. The computing device 1100 further includes a network interface 1140 coupled to the I/O interface 1130. While FIG. 11 shows the computing device 1100 as a single computing device, in various examples the computing device 1100 can include one computing device or any number of computing devices configured to work together as a single computing device 1100.

In various examples, the computing device 1100 can be a uniprocessor system including one processor 1110, or a multiprocessor system including several processors 1110 (e.g., two, four, eight, or another suitable number). The processor(s) 1110 can be any suitable processor(s) capable of executing instructions. For example, in various examples, the processor(s) 1110 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1110 can commonly, but not necessarily, implement the same ISA.

The system memory 1120 can store instructions and data accessible by the processor(s) 1110. In various examples, the system memory 1120 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1120 as modification service code 1125 (e.g., executable to implement, in whole or in part, the modification service 128) and data 1126.

In some examples, the I/O interface 1130 can be configured to coordinate I/O traffic between the processor 1110, the system memory 1120, and any peripheral devices in the device, including the network interface 1140 and/or other peripheral interfaces (not shown). In some examples, the I/O interface 1130 can perform any necessary protocol, timing, or other data transformations to convert data signals from one component (e.g., the system memory 1120) into a format suitable for use by another component (e.g., the processor 1110). In some examples, the I/O interface 1130 can include support for devices attached through various types of peripheral buses, such as a variant of the Peripheral Component Interconnect (PCI) bus standard or the Universal Serial Bus (USB) standard, for example. In some examples, the function of the I/O interface 1130 can be split into two or more separate components, such as a north bridge and a south bridge, for example. Also, in some examples, some or all of the functionality of the I/O interface 1130, such as an interface to the system memory 1120, can be incorporated directly into the processor 1110.

The network interface 1140 can be configured to allow data to be exchanged between the computing device 1100 and other computing devices 1160 attached to a network or networks 1150, such as other computer systems or devices as illustrated in FIG. 1, for example. In various examples, the network interface 1140 can support communication via any suitable wired or wireless general data networks, such as types of Ethernet network, for example. Additionally, the network interface 1140 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1100 includes one or more offload cards 1170A or 1170B (including one or more processors 1175, and possibly including the one or more network interfaces 1140) that are connected using the I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1100 can act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some examples the offload card(s) 1170A or 1170B can perform compute instance management operations, such as pausing and/or un-pausing compute instances, launching and/or terminating compute instances, performing memory transfer/copying operations, etc. These management operations can, in some examples, be performed by the offload card(s) 1170A or 1170B in coordination with a hypervisor (e.g., upon a request from a hypervisor) that is executed by the other processors 1110A-1110N of the computing device 1100. However, in some examples the virtualization manager implemented by the offload card(s) 1170A or 1170B can accommodate requests from other entities (e.g., from compute instances themselves), and can not coordinate with (or service) any separate hypervisor.

In some examples, the system memory 1120 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1100 via the I/O interface 1130. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1100 as the system memory 1120 or another type of memory. Further, a computer-accessible medium can include transmission media or signals such as electrical, electromagnetic, or digital signals, conveyed via a communication medium such as a network and/or a wireless link, such as can be implemented via the network interface 1140.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1018A-1018N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving, at modification service implemented in a cloud provider network, a request to modify a user-provided code segment according to a modification goal, the request including or identifying the user-provided code segment;

obtaining, via use of a database, a set of modification steps, the obtaining comprising:

computing similarity values, wherein each of the similarity values is indicative of a similarity between a representation of the code segment and representations of other code segments;

identifying a largest computed similarity value from the computed similarity values, wherein the largest computed similarity value is indicative of a similarity between the representation of the code segment and a representation of a first other code segment; and obtaining the set of modification steps from a record of the database corresponding to the first other code segment;

generating a modified code segment based at least in part on providing the code segment, one or more of the set of modification steps, and an example modification to a machine learning (ML) model, wherein the example modification includes data associated with the first other code segment; and transmitting the modified code segment for presentation to the user.

2. The computer-implemented method of claim 1, wherein the set of modification steps comprises a sequential list of modification steps.

3. The computer-implemented method of claim 1, wherein the set of modification steps comprises a graph or tree of nodes corresponding to modification steps.

4. A computer-implemented method comprising:

receiving, at modification service implemented in a cloud provider network, a user-provided code segment to be modified according to a modification goal;

obtaining, via use of a machine learning (ML) model or a storage system, a set of modification steps;

generating a modified code segment based at least in part on providing the code segment and one or more of the set of modification steps to the ML model; and transmitting the modified code segment for presentation to the user.

5. The computer-implemented method of claim 4, wherein obtaining the set of modification steps comprises:

identifying at least a first entry in a database based on a computed similarity between a representation of the code segment and a representation of another code segment associated with the first entry, wherein the first entry includes or identifies the set of modification steps.

6. The computer-implemented method of claim 4, wherein obtaining the set of modification steps comprises:

prompting the ML model to generate the set of modification steps, wherein the prompting includes providing the user-provided code segment, a list of candidate modification steps, and a request to identify ones of the list of candidate modification steps as the set of modification steps.

7. The computer-implemented method of claim 4, wherein obtaining the set of modification steps comprises:

determining that a largest computed similarity between a representation of the code segment and representations of other code segments associated with entries of a database is beneath a threshold amount of similarity; and prompting the ML model to generate the set of modification steps.

8. The computer-implemented method of claim 4, wherein the set of modification steps comprises a sequential list of modification steps.

9. The computer-implemented method of claim 4, wherein the set of modification steps comprises a graph or tree of nodes corresponding to modification steps.

10. The computer-implemented method of claim 9, wherein generating the modified code segment includes:

generating a first result by prompting the ML model to apply a first of the set of modification steps to an input code segment;

generating a second result by prompting the ML model to apply a second of the set of modification steps to the input code segment;

evaluating a comparative benefit of utilizing the first result versus the second result for reaching the modification goal; and determining to utilize the first result but not the second result as part of generating the modified code segment.

11. The computer-implemented method of claim 4, wherein generating the modified code segment comprises providing the code segment and all of the set of modification steps to the ML model and receiving the modified code segment from the ML model as output.

12. The computer-implemented method of claim 4, wherein generating the modified code segment comprises prompting the ML model once for each of the set of modification steps.

13. The computer-implemented method of claim 4, wherein the set of modification steps includes a first modification step having an associated condition, wherein the first modification step is executed when the condition is evaluated to be true and skipped when the condition is evaluated to be false.

14. The computer-implemented method of claim 4, wherein the user-provided code segment was received from a computing device executing an integrated development environment (IDE) or console application, wherein the IDE or console application caused a transmission of a request to modify the user-provided code segment.

15. A system comprising:

a first one or more computing devices to host a machine learning (ML) model in a multi-tenant cloud provider network; and a second one or more computing devices to implement a modification service in the multi-tenant cloud provider network, the modification service including instructions that upon execution cause the modification service to:

receive a user-provided code segment to be modified according to a modification goal;

obtain, via use of the ML model or a database, a set of modification steps;

generate a modified code segment based at least in part on providing the code segment and one or more of the set of modification steps to the ML model; and transmit the modified code segment for presentation to the user.

16. The system of claim 15, wherein to obtain the set of modification steps the modification service is at least to:

prompt the ML model to generate the set of modification steps, wherein the prompting includes providing the user-provided code segment, a list of candidate modification steps, and a request to identify ones of the list of candidate modification steps as the set of modification steps.

17. The system of claim 15, wherein to obtain the set of modification steps the modification service is at least to:

identify at least a first entry in the database based on a computed similarity between a representation of the code segment and a representation of another code segment associated with the first entry, wherein the first entry includes or identifies the set of modification steps.

18. The system of claim 15, wherein to obtain the set of modification steps the modification service is at least to:

determine that a largest computed similarity between a representation of the code segment and representations of other code segments associated with entries of the database is beneath a threshold amount of similarity; and prompt the ML model to generate the set of modification steps.

19. The system of claim 15, wherein the set of modification steps comprises a sequential list of modification steps.

20. The system of claim 15, wherein the set of modification steps comprises a graph or tree of nodes corresponding to modification steps.

* * * * *